March 2, 1937.  C. L. CUMMINS  2,072,545
FUEL INJECTOR STRUCTURE FOR OIL ENGINES
Original Filed Nov. 7, 1932
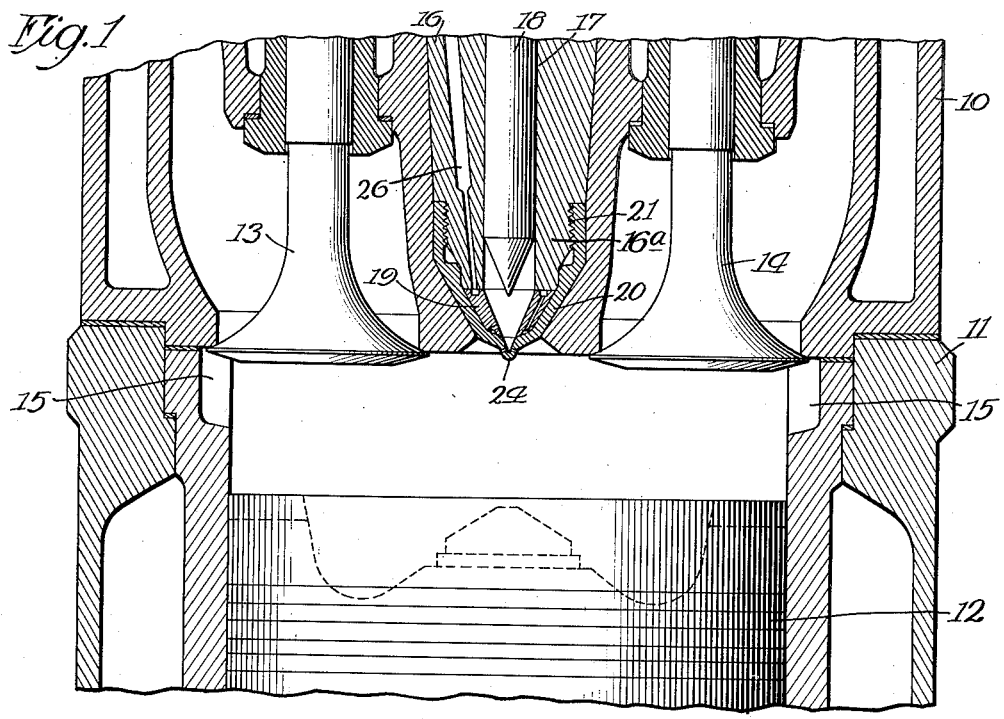
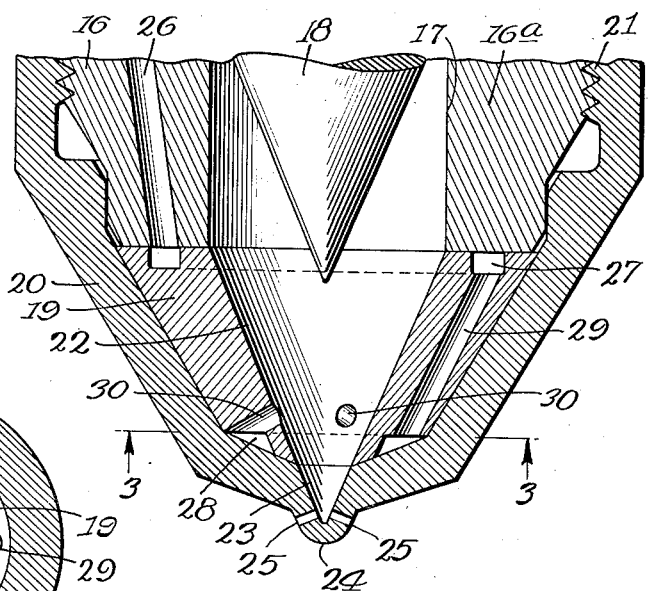
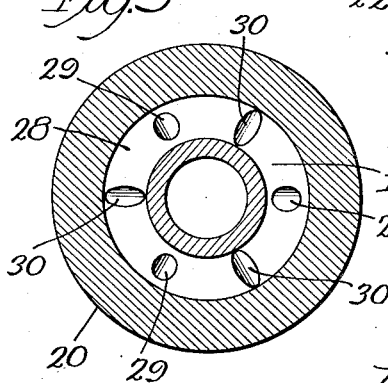
Inventor
Clessie L. Cummins
By Rector, Hibben, Davis & Macauley
Attys.

Patented Mar. 2, 1937

2,072,545

UNITED STATES PATENT OFFICE 2,072,545

FUEL INJECTOR STRUCTURE FOR OIL ENGINES

Clessie L. Cummins, Columbus, Ind., assignor to Oil Engine Development Company, Columbus, Ind., a corporation of Indiana Application November 7, 1932, Serial No. 641,491
Renewed December 14, 1935

4 Claims. (Cl. 123—33)

My invention relates to oil burning engines, and it has to do more particularly with injector structure for devices of the foregoing character.

The principal object of my invention is to provide a new and improved fuel injector means which provides for the delivery of fuel into the combustion chamber of the cylinder in proper form and quantity at all speeds; reduces fuel waste to the minimum and insures increased economy in operation; provides for smooth operation at low speeds and when idling with the throttle nearly closed; eliminates the possibility of drainage of raw fuel into the injector discharge nozzle and into the combustion chamber when the engine is at rest; practically eliminates the formation of carbon deposits on the injector discharge means; provides for an immediately available supply of fuel for combustion purposes with resultant quick starting with minimum cranking; provides for a cleaner exhaust with a minimum of smoking; and insures an increased flow of power.

Another object is to provide a simple and inexpensive structure for accomplishing the foregoing features and advantages and which insures high operating efficiency over long periods of operation with a minimum of maintenance attention and expense.

Other objects and advantages will become apparent as this description progresses and by reference to the drawing wherein:—

Figure 1 is a vertical sectional view of a portion of one form of engine embodying my invention;

Fig. 2 is an enlarged fragmental sectional view of the injector structure shown in Fig. 1; and Fig. 3 is a section taken substantially on line 3—3 of Fig. 2.

I have chosen to illustrate my invention in its application to a four-cycle engine of the Cummins' type, but it is to be understood that my novel injector structure has utility in connection with other types of engines. Referring particularly to the drawing, the structure shown comprises a cylinder head 10 applied to the cylinder 11 in which operates a reciprocating piston 12 which may be similar in construction to the piston disclosed in my U. S. Patent No. 1,865,841. This engine also includes an air intake valve 13 and an exhaust valve 14 which may be of any approved construction. The upper end of the cylinder 11 is provided with recesses 15 to accommodate movement of these valves 13, 14.

My invention has to do particularly with the fuel injector structure which will now be described. The cylinder head 10 supports, in any desirable manner, a centrally disposed plug or body member 16 having a central bore 17 in which there is mounted for vertical reciprocating movement an injector plunger 18. The lower end of the plug 16 is extended in conical fashion by a separate, inner, cup-shaped member 19 which is supported in position upon the plug 16 by an outer, conical and similarly shaped cup member 20. The outer cup member has threaded connection, as at 21, with the lower reduced end 16ª of the plug 16 so that the parts may be secured together in tight fit relation to avoid fuel leakage. The lower end of the plunger 18 is cone shaped and the inner cup 19 is provided with a complemental, conical opening in which the conical end of the plunger fits in its lowered portion, so that when the plunger 18 is retracted there is provided an atomizing or mixing chamber 22 beneath the plunger. The outer cup 20 is provided in its discharge end with a conical cavity 23 which aligns with the walls of the chamber 22 and forms an apex extension of such chamber to receive the lower pointed end of the plunger in the fully lowered position of the latter. The lower end of the outer cup 20 is also provided with a nozzle extension 24 which is provided with a plurality of very restricted, radially-directed ports 25 which communicate the lower end of the atomizing or vaporizing chamber 22 with the combustion chamber of the engine.

The atomizing or mixing chamber 22 is connected to the fuel supply in the following manner: The body 16 is provided with a longitudinal fuel passage 26 which extends to its lower flat end where it connects with an annular groove 27 formed in the top of the inner cup 19 and closed by the lower flat end of the body 16. The lower, outer wall portion of the inner cup is provided with an annular groove 28 which, upon assembly of the outer and inner cups 19, 20, constitutes an annular chamber which is connected to the upper annular fuel groove 27 by a plurality (preferably, but not necessarily, three) longitudinally directed ports 29. The fuel chamber 28 is, in turn, connected to the atomizing or mixing chamber by a plurality (preferably, but not necessarily, three) upwardly directed and upwardly discharging ports 30.

The flow of fuel to and through the fuel passage 26 may be controlled in any desired manner, and I have not shown in the drawing such fuel controlling means or the means for reciprocating the plunger 11 since it is obvious that any desired or improved form of devices may be employed for these purposes.

The abutting surfaces between the inner and outer cups, between the outer cup and the plug body and between the plug body and the inner cup are of a close ground fit, and the conical shape of the inner and outer cups together with the fitting of these parts insures perfect seating of the plug upon the top of the inner cup eliminating the possibility of leakage of fuel past the cups and up around the plug or body of the injector. This arrangement also provides such a metal-to-metal seating that uninterrupted heat flow from the cups 19, 20 to their cooled support in the cylinder head is assured. The threaded connection between the plug body and the outer cup also insures the proper and firm drawing together of these parts for the accomplishment of these features.

The operation of the injecting mechanism is, generally, similar to that described in my United States Patent No. 1,561,913. During the suction stroke of the piston 12, the plunger 18 is slowly raised, air is drawn into the cylinder past the air valve 13 and a charge of fuel oil is forced through the ports 30 into the conical end of the mixing or atomizing chamber 22. During the compression stroke of the piston, part of the heated air, compressed in the combustion space of the cylinder and heated, due to its compression, is forced to flow through the ports 25 into the chamber 22 where the oil, which has been deposited in the lower end of the chamber 22, is entrained and thoroughly mixed with the air. Near the beginning of the power stroke of the piston, plunger 18 is lowered to inject the mixture of fuel and air from the chamber 22 through the ports 25 into the combustion space where the combustible charge is ignited or exploded thus driving the piston 12 downwardly.

In carrying out my invention, the ports 30 which discharge directly into the lower end of the mixing or atomizing chamber 22 are directed upwardly from their supply chamber 28. With this arrangement, I have found that liquid fuel is not discharged into the chamber 22 except when positively impelled thereinto under the influence of the operating agencies hereinabove described. The ports 30 and fuel passages leading thereto are comparatively small, which arrangement, coupled with the effect of capillary attraction, friction between the fluid and the port and passage surfaces and the upward discharge through the ports 30, are contributing agencies in the accomplishment of the result above stated. By this arrangement, only that amount of fuel required for operation under any speed condition is fed with consequent reduction in fuel waste and increased economy in operation. When the engine is at rest, due to the agencies above mentioned, fuel leakage or drainage into the chamber 22 and through the ports 25 and upon the nozzle 24 is avoided wherefore fouling of the cups is prevented and the forming of carbon deposits upon the nozzle 24 and in and around the ports 25 is practically eliminated so that clogging of the ports 25 does not take place and their capacity is maintained at the intended maximum. The fuel passages are always full of raw fuel so that the supply of fuel through the port 30 into the chamber 22 is immediately available and the engine will start immediately under practically all operating and weather conditions. The elimination of the excess raw fuel discharge also insures a cleaner exhaust and reduces smoking to the very minimum. These features and advantages are accomplished with a minimum of operating parts which may be constructed cheaply, and the arrangement in its entirety is such that maximum efficiency in operation is practically insured over long periods of time with a minimum maintenance expense.

It will be understood that while I have shown only one form of structure embodying my invention, other changes in details and arrangements of parts may be resorted to without departing from the spirit and scope of my invention as defined by the claims which follow:

I claim:

1. In an oil engine, the combination of a cylinder having a combustion space, a piston operable therein, and means for delivering air thereto, of fuel injector mechanism which comprises a body member having a central bore therein, another member at one end of said body member having a bore therein aligned with said body bore and forming with the latter a mixing chamber, a third member surrounding said second member and having a nozzle with ports adapted to communicate with said mixing chamber and to discharge directly into said combustion space, said third member having threaded connection with said body member only for securing all said parts together as a unit, means including a fuel chamber between said second and third members above and independent of said nozzle ports and one or more upwardly directed ports in said second member connected to said fuel chamber and leading therefrom upwardly to discharge directly into said mixing chamber above said nozzle ports for delivering liquid fuel to said mixing chamber, and means for controlling said delivery of fuel and also admission of air through said nozzle ports to said mixing chamber and for controlling discharge of the mixture from said chamber.

2. In an oil engine, the combination with a cylinder having a combustion space, a piston operable therein, and means for admitting air thereto, of fuel injector mechanism which comprises a cylindrical plug-like body having a central bore and a fuel passage therein, a conically-shaped member having a mixing chamber therein and having its larger end abutting the lower end of said body and forming a conical extension on the latter with said mixing chamber aligned with said body bore, said member having a fuel passage connecting with the fuel passage of said body, a cup-shaped member having a conical end part shaped complementally to said conically-shaped member which is snugly and uniformly nested therein, and also provided with a cylindrical part having threaded connection with said body whereby said cup-shaped member may be screwed on to said body to firmly and evenly seat the abutting ends of said body and conically-shaped member against each other and said two nested members against each other in substantially sealed fashion, a discharge nozzle portion on said cup-shaped member extending into said combustion space and having ports therein connecting said mixing chamber and said combustion space, said conically-shaped member having an external groove covered by said cup-shaped member to provide a fuel chamber above said discharge nozzle portion and which is directly connected to the fuel passage of said conically-shaped member and is also connected to said mixing chamber by port means independently of and above said ports in said discharge nozzle portion, and means controlling admission of air through said discharge nozzle ports and fuel from said fuel chamber to said mixing chamber and for discharging the mixture from said chamber.

3. An oil injecting device for an oil engine having a combustion space, which includes a main body having a reduced and flat bottom lower end, screw threads above said lower end, a central bore and a fuel passage opening into said flat end, a plunger in said bore, a first cup-shaped member having a central conical opening, a conical exterior and a flat upper face substantially the width of the lower end of said body against which it seats, and a second and deeper cup-shaped member enclosing said first cup-shaped member and having internal screw threads adjacent its upper end coacting with the screw threads on said body, the lower interior portion of said second cup-shaped member being conical for nested reception of said first cup-shaped member, and the mid-interior portion of said second cup-shaped member being shaped complementally to the lower exterior end portion of said body, the arrangement being such that said body and cup-shaped members are firmly assembled together by said screw threads so that there is a leak-proof contact between the bottom end of said body and the upper end of said first cup-shaped member and between the conical exterior of said first cup-shaped member and said conical interior of said second cup-shaped member, and between the exterior of the lower end portion of said body and the mid-interior of said second cup-shaped member, there also being an annular channel in one of said flat ends, an oil passage from said channel to the interior of said first cup-shaped member, and discharge ports in the lower end of said second cup-shaped member leading from the lower end of said conical opening in said first cup-shaped member into the combustion space of the engine.

4. In an oil engine, the combination of a cylinder having a combustion space, a piston operable therein, and means for delivering air thereto, of fuel injector mechanism which comprises a body member having a central bore therein, another member at one end of said body member having a conical bore therein aligned with said body bore and forming a mixing chamber, a third member surrounding said second member and having a nozzle with ports adapted to communicate with said mixing chamber and to discharge directly into said combustion space, said third member having threaded connection with said body member only for securing all of said parts together as a unit, means including a fuel chamber between said second and third members above and independent of said nozzle ports, and one or more fuel ports in said second member connected to said fuel chamber and leading therefrom into said conical mixing chamber above and entirely independent of said nozzle ports for delivering liquid fuel to said mixing chamber, and a plunger having a conical end reciprocating in said central and conical bores and adapted, when at the lower end of its stroke, to have its conical end positively close said fuel ports against the passage of fuel therethrough.

CLESSIE L. CUMMINS.